(12) United States Patent
Carr et al.

(10) Patent No.: US 10,740,826 B2
(45) Date of Patent: Aug. 11, 2020

(54) ITEM REMINDER SYSTEMS AND METHODS

(71) Applicant: Wal-Mart Stores, Inc., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1029 days.

(21) Appl. No.: 14/529,943

(22) Filed: Oct. 31, 2014

(65) Prior Publication Data

US 2016/0125506 A1 May 5, 2016

(51) Int. Cl.
  *G06Q 30/00* (2012.01)
  *G06Q 30/06* (2012.01)
  *G06Q 30/02* (2012.01)

(52) U.S. Cl.
  CPC ......... *G06Q 30/0633* (2013.01); *G06Q 30/02* (2013.01); *G06Q 30/0255* (2013.01); *G06Q 30/0631* (2013.01); *G06Q 30/0641* (2013.01)

(58) Field of Classification Search
  None
  See application file for complete search history.

(56) References Cited

U.S. PATENT DOCUMENTS

| | | | |
|---|---|---|---|
| 4,996,642 A | 2/1991 | Hey | |
| 6,123,259 A | 9/2000 | Ogasawara | |
| 7,113,917 B2 | 9/2006 | Jacobi | |
| 7,130,814 B1 | 10/2006 | Szabo | |
| 7,359,871 B1 | 4/2008 | Paasche | |
| 8,180,688 B1 | 5/2012 | Velummylum | |
| 8,370,271 B1 | 2/2013 | Robinson | |
| 8,583,512 B1 | 11/2013 | Gupta | |
| 8,600,835 B1 | 12/2013 | Lueck | |
| 8,744,923 B1 | 6/2014 | McKay | |
| 2005/0222966 A1* | 10/2005 | Sadri | G06F 17/30861 |
| 2008/0015951 A1 | 1/2008 | Kerker | |
| 2008/0243632 A1 | 10/2008 | Kane | |

(Continued)

FOREIGN PATENT DOCUMENTS

| WO | WO2001029726 A2 | 4/2001 |
| WO | WO2002/006983 | 1/2002 |

OTHER PUBLICATIONS

Wu, Yi-Jing, An Enhanced Recommendation Scheme for Online Grocery Shopping, Aug. 4, 2011, 2011 IEEE 15th International Symposium on Consumer Electronics, pp. 410-415 (Year: 2011).*

*Primary Examiner* — Michael Misiaszek
*Assistant Examiner* — Timothy J Kang
(74) *Attorney, Agent, or Firm* — Bryan Cave Leighton Paisner LLP (57) ABSTRACT

Example item reminder systems and methods are described. In one implementation, a method receives a request to create an order and receives identification of multiple items in the order. The method identifies multiple items regularly purchased by a customer but not included in the multiple items. The method also identifies a purchase frequency of the regularly purchased items. If any of the regularly purchased items are due for purchase, based on the purchase frequency, the customer is presented with an option to purchase those regularly purchased items that are due for purchase.

20 Claims, 6 Drawing Sheets

(56) References Cited

U.S. PATENT DOCUMENTS

| | | |
|---|---|---|
| 2008/0243637 A1 | 10/2008 | Chan |
| 2009/0240518 A1* | 9/2009 | Borom .................. G06Q 30/02 |
| | | 705/14.1 |
| 2009/0271265 A1 | 10/2009 | Lay |
| 2012/0173626 A1* | 7/2012 | Reis .................. G06Q 30/0241 |
| | | 709/204 |
| 2012/0179582 A1* | 7/2012 | Yu ........................ G06Q 10/083 |
| | | 705/27.1 |
| 2013/0138486 A1* | 5/2013 | Gao .................. G06Q 30/0218 |
| | | 705/14.2 |
| 2014/0150005 A1* | 5/2014 | Kalmes ............ H04N 21/25866 |
| | | 725/14 |
| 2014/0279204 A1 | 9/2014 | Roketenetz |
| 2015/0006314 A1* | 1/2015 | Goulart .............. G06Q 30/0631 |
| | | 705/26.7 |
| 2015/0058173 A1* | 2/2015 | Schmeling ......... G06Q 30/0629 |
| | | 705/26.64 |

* cited by examiner

ITEM REMINDER SYSTEMS AND METHODS

TECHNICAL FIELD

The present disclosure relates to item reminder systems and methods that suggest additional items a customer may want to add to an order.

BACKGROUND

With the increasing popularity of online shopping, many merchants allow customers to purchase items online and have the items delivered to their home instead of going to shop for the items at a physical store. In some situations, the items (e.g., grocery items and perishable items) are delivered from a local store to the customer's residence or business. When shopping for grocery items, some products are purchased at regular intervals, such as fresh fruit, dairy products, and the like. For example, since perishable items will spoil after a particular period of time, customers typically replenish these items on a regular basis.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

The systems and methods described herein generate suggested items a customer can add to a current order. As described herein, a customer creates an order by selecting multiple items from, for example, a merchant's website. The systems and methods identify multiple items that are regularly purchased by the customer, but not included in the current order. These systems and methods also identify a purchase frequency of the regularly purchased items as well as whether any of the regularly purchased items are due for purchase based on the purchase frequency. The customer is presented with an option to add one or more of the regularly purchased items to their current order. Thus, the systems and methods discussed herein help customers remember to purchase regular items that they might otherwise forget to order. In the following discussion, the terms "user" and "customer" are used interchangeably.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Figure 1:
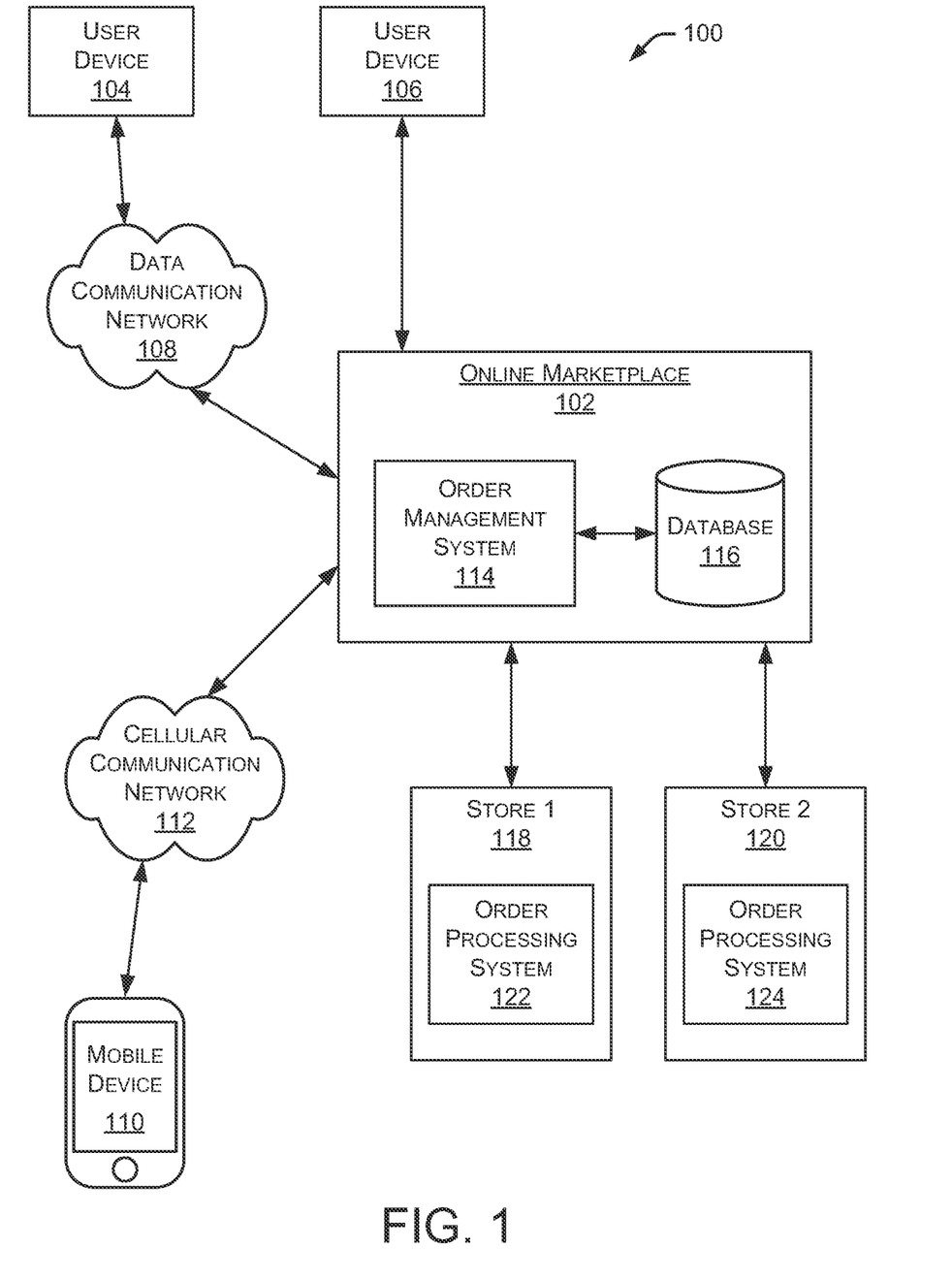
FIG. 1 is a block diagram depicting an environment within which an example embodiment may be implemented.

FIG. 1 is a block diagram depicting an environment 100 within which an example embodiment may be implemented. Environment 100 includes an online marketplace 102 coupled to user devices 104 and 106. In this example, online marketplace 102 is coupled directly to user device 106, and coupled to user device 104 through a data communication network 108, such as the Internet. Additionally, online marketplace 102 is coupled to a mobile device 110 through a cellular communication network 112. Although two user devices 104, 106 and one mobile device 110 are shown in FIG. 1, alternate embodiments may include any number of user devices 104, 106 and mobile devices 110 coupled to online marketplace 102. User devices 104, 106 and mobile device 110 include any type of device capable of communicating with online marketplace 102 through data communication network 108 or cellular communication network 114, such as a cellular phone, a smart phone, a tablet computer, a laptop computer, a desktop computer, a portable entertainment device, a portable gaming device, a gaming console, a set top box, and the like.

Online marketplace 102 includes any type of website or online service that is accessible by one or more customers to purchase any type of product or service. Online marketplace 102 may be implemented using one or more systems and/or services, such as web servers, application servers, and the like. A particular online marketplace 102 may offer products or services associated with a single entity (e.g., a single merchant) or from multiple different entities. In some embodiments, online marketplace 102 is implemented by the entity (e.g., merchant) offering the products or services. In other embodiments, online marketplace 102 is implemented by a third party for the benefit of the merchant. Online marketplace 102 may also be referred to as an "ecommerce site," a "mobile commerce site," an "ecommerce marketplace," or an "online ecommerce marketplace." As discussed herein, online marketplace 102 includes an order management system 114 and a database 116, which stores, for example, information associated with the products and services available through online marketplace 102. Database 116 may also store customer data, order data, item availability data, frequently purchased items, payment data, delivery data, physical store data, and the like. In some embodiments, database 116 stores data utilized by one or more servers to implement online marketplace 102.

Online marketplace 102 communicates with various systems, services, and devices through data communication network 108. Data communication network 108 may utilize any communication protocol and any type of communication medium. In some embodiments, data communication network 108 is a combination of two or more networks coupled to one another. Online marketplace 102 also communicates with various systems and devices, such as mobile devices, through cellular communication network 112, which may utilize any communication protocol and any type of communication medium. In some embodiments, cellular communication network 112 is a combination of two or more networks coupled to one another.

Online marketplace 102 is also coupled to physical stores 118 and 120. In some embodiments, physical stores 118 and 120 are associated with the same merchant associated with online marketplace 102, and located in different geographic locations. Physical stores 118 and 120 may also be referred to as "brick and mortar" stores. Physical store 118 includes an order processing system 122 and physical store 120 includes an order processing system 124. Order processing systems 122 and 124 interact with order management system 114, and other components and systems within online marketplace 102, to support identification, fulfillment, and delivery of items in an order to a user (e.g., a customer of online marketplace 102). In some embodiments, order management system 114 communicates orders to a specific physical store based on the customer's geographic proximity to the physical store. In other embodiments, the customer selects a particular physical store to deliver the order. Although two physical stores 118, 120 are shown in FIG. 1, alternate embodiments may include any number of physical stores (and corresponding order processing systems) coupled to online marketplace 102.

Figure 2:
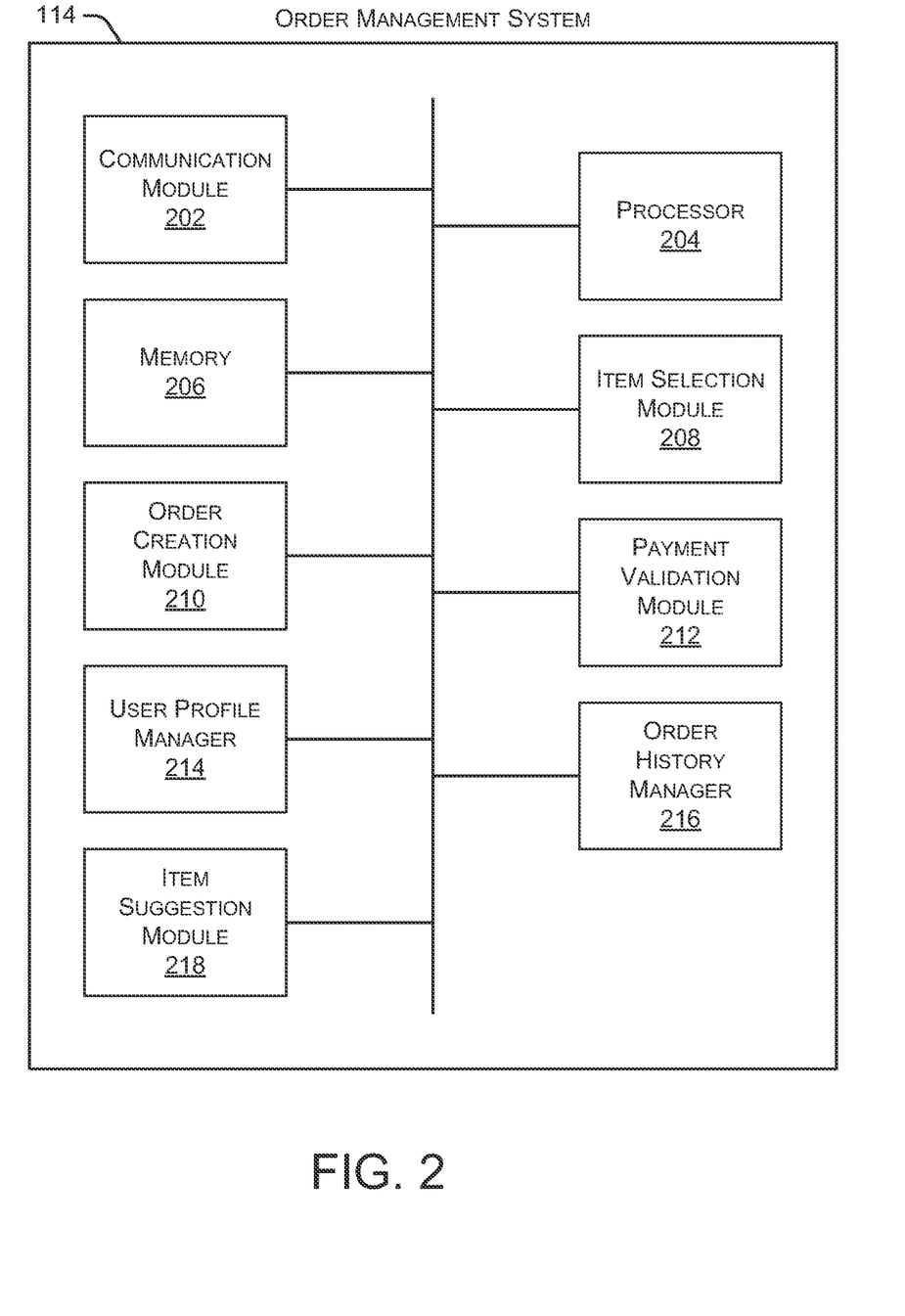
FIG. 2 is a block diagram depicting an embodiment of an order management system.

FIG. 2 is a block diagram depicting an embodiment of order management system 114. Order management system 114 performs various functions related to the operation of online marketplace 102, as discussed herein. Order management system 114 includes a communication module 202, a processor 204, and a memory 206. Communication module 202 allows order management system 114 to communicate with other systems, such as communication networks, other servers, user devices 104, 106, mobile device 110, physical stores 118, 120, order processing systems 122, 124, and the like. Processor 204 executes various instructions to implement the functionality provided by order management system 114. Memory 206 stores these instructions as well as other data used by processor 204 and other modules contained in order management system 114.

Order management system 114 also includes an item selection module 208, which allows users to select one or more items to purchase through online marketplace 102. Order management system 114 further includes an order creation module 210, which handles the receiving and creation of orders containing any number of items. In some embodiments, order creation module 210 manages online shopping carts, order checkout processes, shipping policies, delivery policies, and the like. A payment validation module 212 performs various functions associated with the validation and processing of user payments.

Order management system 114 further includes a user profile manager 214, which maintains various information about users of online marketplace 102. For example, user profile manager 214 may store information regarding user names, user accounts, user buying habits, user delivery address, user payment methods, and the like. An order history manager 216 identifies items purchased on a regular basis by particular customers, and frequencies of those purchases. Order history manager 216 may also track other buying habits, item preferences, brand preferences, etc. associated with any number of customers. An item suggestion module 218 determines whether to suggest any additional items to a particular customer for addition to an existing order. Item suggestion module 218 can also select the best candidate items to suggest to a particular user based on buying habits, purchase frequencies, and the like. Additional details regarding the suggestion of items to a particular customer are discussed herein.

Figure 3:
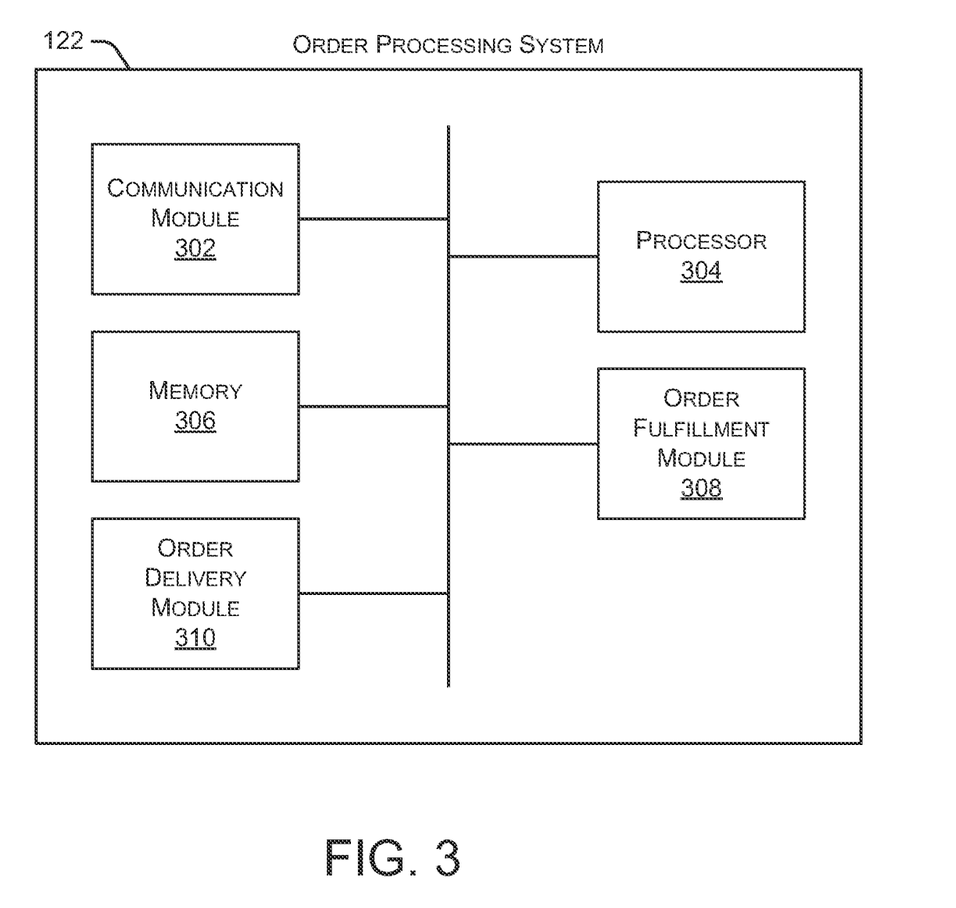
FIG. 3 is a block diagram depicting an embodiment of an order processing system.

FIG. 3 is a block diagram depicting an embodiment of order processing system 122. Order processing system 124 associated with physical store 120 may contain similar components and systems as order processing system 122 discussed below. Order processing system 122 performs various functions at a physical store that will fulfill and deliver specific orders that are placed, for example, through online marketplace 102. Order processing system 122 includes a communication module 302, a processor 304, and a memory 306. Communication module 302 allows order processing system 122 to communicate with other systems, such as communication networks, other servers, order management system 114, and the like. Processor 304 executes various instructions to implement the functionality provided by order processing system 122. Memory 306 stores these instructions as well as other data used by processor 304 and other modules contained in order processing system 122.

Order processing system 122 also includes an order fulfillment module 308 that generates instructions for fulfilling an order (e.g., picking and packaging items contained in the order). In some embodiments, the order fulfillment instructions are received from order management system 114. The order fulfillment instructions may include identification of where to find each item in a particular physical store or warehouse. An order delivery module 310 generates instructions for delivering an order, such as delivery address, driving directions, delivery time (or delivery time window), and the like.

As discussed above, order management system 114 includes order fulfillment module 216 and order delivery module 218. Additionally, order processing system 122 includes order fulfillment module 308 and order delivery module 310. In some embodiments, fulfillment modules 216 and 308 share the order fulfillment tasks, such as generation of the order fulfillment instructions. For example, order fulfillment module 216 may generate the order fulfillment instructions and communicate those instructions to order fulfillment module 308, which adds picking and packaging instructions based on the layout of the particular physical store. Similarly, in some embodiments, order delivery module 218 and order delivery module 310 may share the order delivery generation tasks. For example, order delivery module 218 may identify a delivery location and delivery time window, while order delivery module 310 adds delivery instructions, delivery personnel, and other details based on the location of the physical store and the delivery location of the customer.

Figure 4:
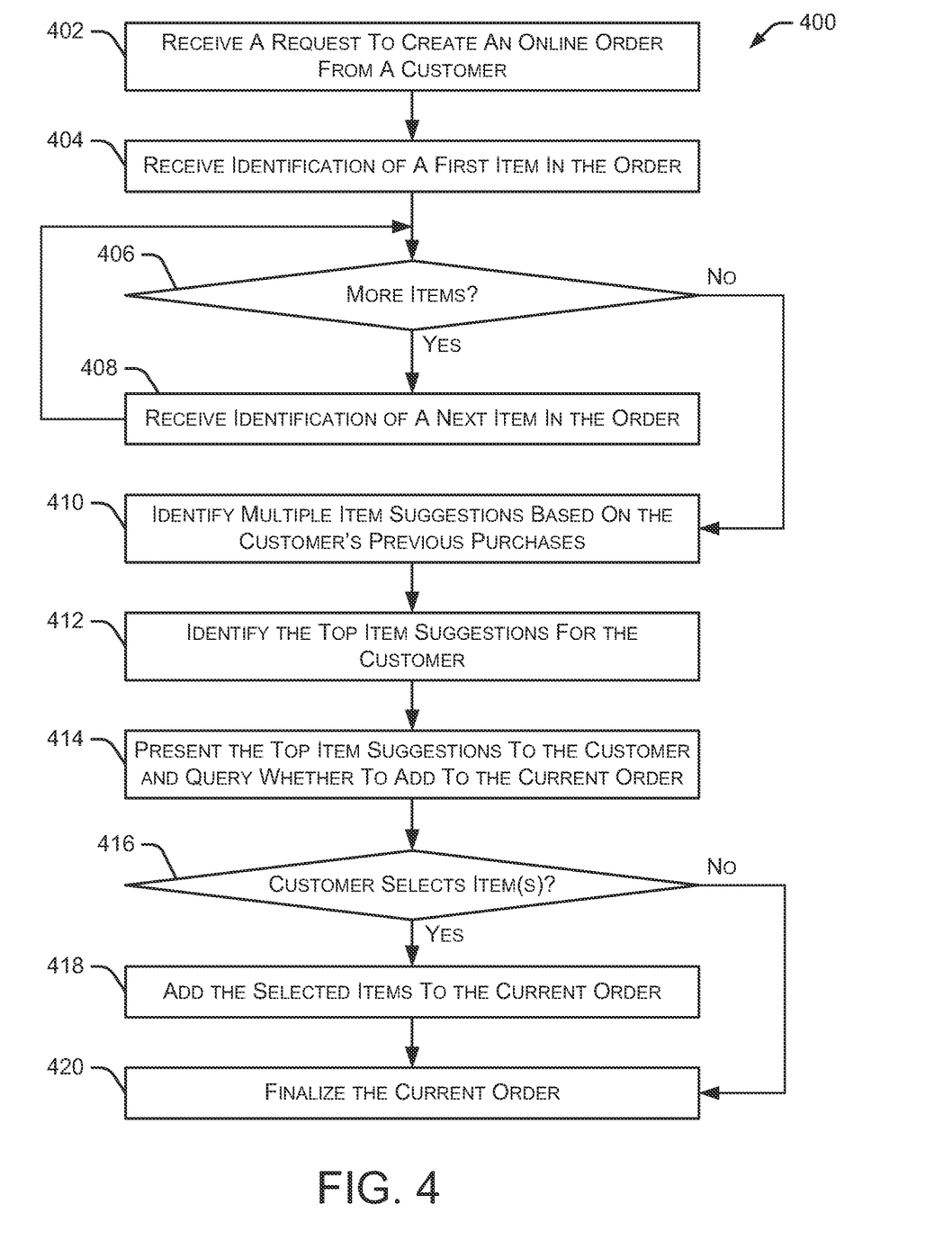
FIG. 4 is a flow diagram depicting an embodiment of a method for processing a customer order and suggesting additional items to the customer.

FIG. 4 is a flow diagram depicting an embodiment of a method 400 for processing a customer order and suggesting additional items to the customer. In some embodiments, method 400 is performed by order management system 114. In other embodiments, method 400 is partially performed by order management system 114 and partially performed by order processing system 122 or 124. Initially, a request is received from a customer to create an online order at 404. Method 400 also receives identification of a first item in the order at 404. The method then determines whether the customer wants to add more items to the order at 406. For example, the system may query the customer regarding additional items or wait for the customer to either select an additional item or click a "Complete Order" button presented through a user interface.

If the customer wants to add more items to the order, method 400 continues at 408 by receiving identification of a next item in the order. This process of adding items to the order continues until the customer indicates that the order is complete. When all items have been added to the order, method 400 identifies multiple item suggestions based on the customer's previous purchases at 410. Additional details regarding the identification of suggested items are discussed herein with respect to FIG. 5.

Method 400 continues by identifying the top item suggestions for the customer at 412. In some embodiments, the number of top item suggestions is limited to a specific number of items (N), such as the top five or top seven items. In other embodiments, any number of item suggestions are presented to the customer. In alternate embodiments, only the top item suggestion is identified. Method 400 displays the top item suggestions (or suggestion) to the customer and queries the customer regarding whether to add any of the suggested items to the current order at 414. If the customer chooses not to add any of the suggested items to the current order, the order is finalized at 420. If the customer selects one or more of the suggested items, the selected items are added to the current order at 418, and the order is finalized at 420.

Figure 5:
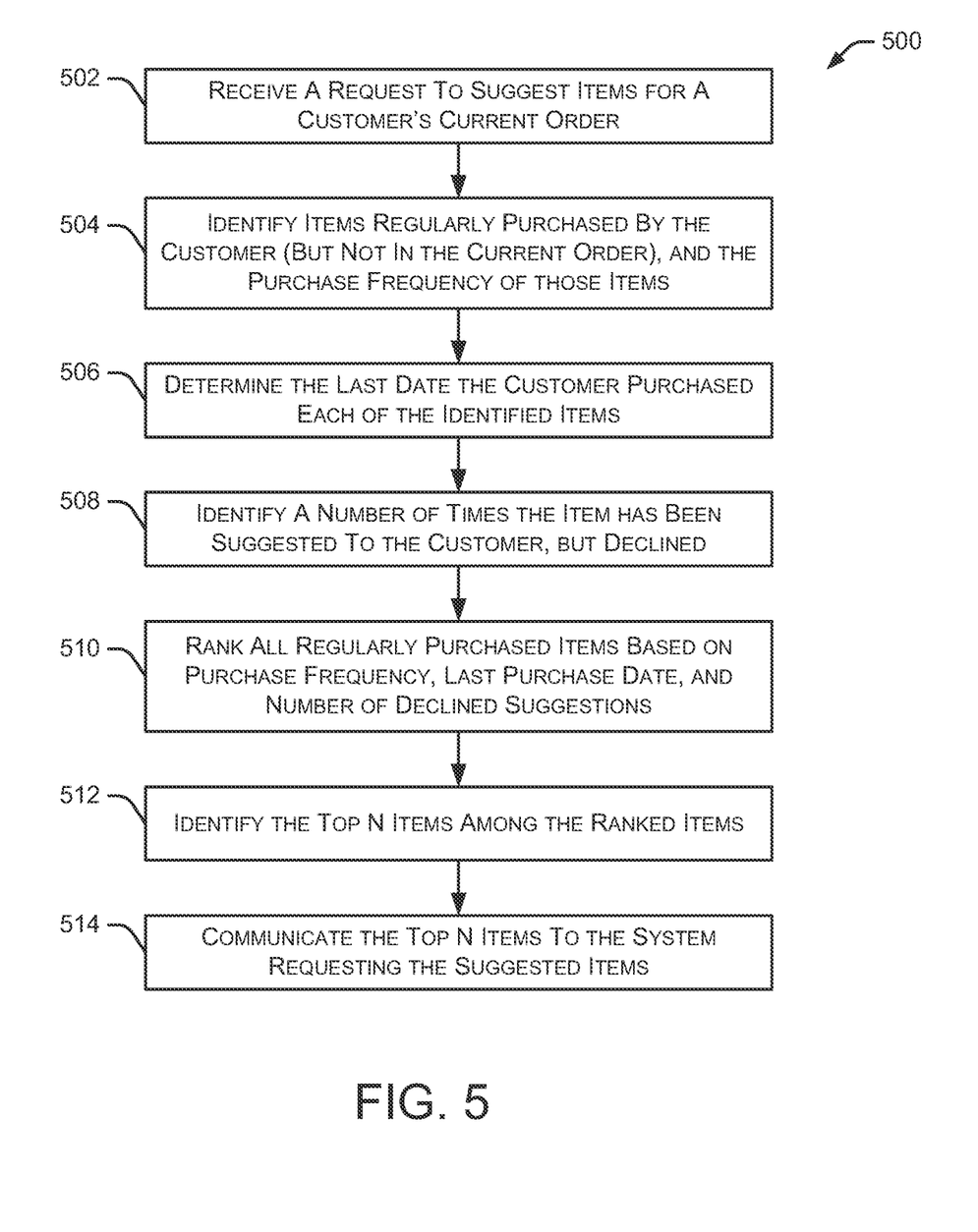
FIG. 5 is a flow diagram depicting an embodiment of a method for selecting additional items to suggest to the customer.

FIG. 5 is a flow diagram depicting an embodiment of a method 500 for selecting additional items to suggest to the customer. In some embodiments, method 500 is performed by order management system 114. In other embodiments, method 400 is partially performed by order management system 114 and partially performed by order processing system 122 or 124. Initially, a request is received to suggest items for a customer's current order at 502. Method 500 identifies items regularly purchased by the customer (but not in the current order) and the purchase frequency of those items at 504. For example, a particular customer may typically purchase toothpaste every four weeks and may purchase bananas every week.

Method 500 continues by determining the last date the customer purchased each of the identified items at 506. For example, the system may determine that the customer last purchased toothpaste six weeks ago and last purchased bananas 10 days ago. Method 500 also identifies at 508 a number of times the item has been suggested to the customer, but the customer declined to add the item to their order. In some embodiments, method 500 monitors the number of times a customer has declined to add an item to their order since the last time the customer purchased that item. If the number of times a customer has declined to add an item exceeds a threshold value, that item may not be suggested to the customer. For example, if the customer last purchased toothpaste six weeks ago, the system will identify the number of times toothpaste has been suggested to the customer within the last six weeks. Any item suggestions presented to the user more than six weeks ago are not considered.

The number of times a customer has declined to add an item to their order may be an indication that the customer no longer wants to purchase that item. For example, the customer may no longer like the item, may have selected a different type of item, may have selected a different brand of the item, may have stopped using the item, or may be purchasing the item from a different merchant. In some embodiments, method 500 may limit the number of times an item is suggested to a particular customer. For example, if a customer declines a suggestion to add toothpaste to their order four consecutive times, the system may no longer suggest toothpaste (e.g., that particular brand of toothpaste) to the customer.

In some embodiments, customers can choose not to receive item suggestions related to a particular item (or a particular category of items). Additionally, customers can choose not to receive any item suggestions. In some implementations, customers can request reminders for particular items at predetermined intervals. Customer requests for item reminders are typically provided a high ranking, as discussed herein.

Method 500 continues at 510 where all regularly purchased items are ranked based on purchase frequency, last purchase date, and number of declined suggestions for the item. When ranking the regularly purchased items, method 500 does not consider items that are already contained in the current order. Additionally, items that were purchased recently (i.e., within the typical purchase frequency) are not considered when ranking items. For example, if the customer typically purchases shampoo every six weeks and that item was purchased within the past six weeks, the item is not ranked and not considered as an item to suggest with the current order.

After ranking the items at 510, method 500 identifies the top N items among all of the ranked items at 512. N represents any number and may be determined by a system administrator or other user. In some embodiments, method 500 identifies the top 5 items top 10 items, or any other number of items. The top N items are then communicated to the system or process requesting the suggested items at 514.

In some embodiments, the ranking of items is also based on the number of items in stock for a for each item (e.g., in stock at a central warehouse or a physical store that will deliver the order to the customer). Items with higher available stock are ranked higher than items with low stock (or out of stock items).

In some embodiments, the ranking of items is further based on purchases by other customers. Items that are top sellers and/or popular with many other customers, those items are ranked higher than items that are poor sellers or not popular with other customers.

Figure 6:
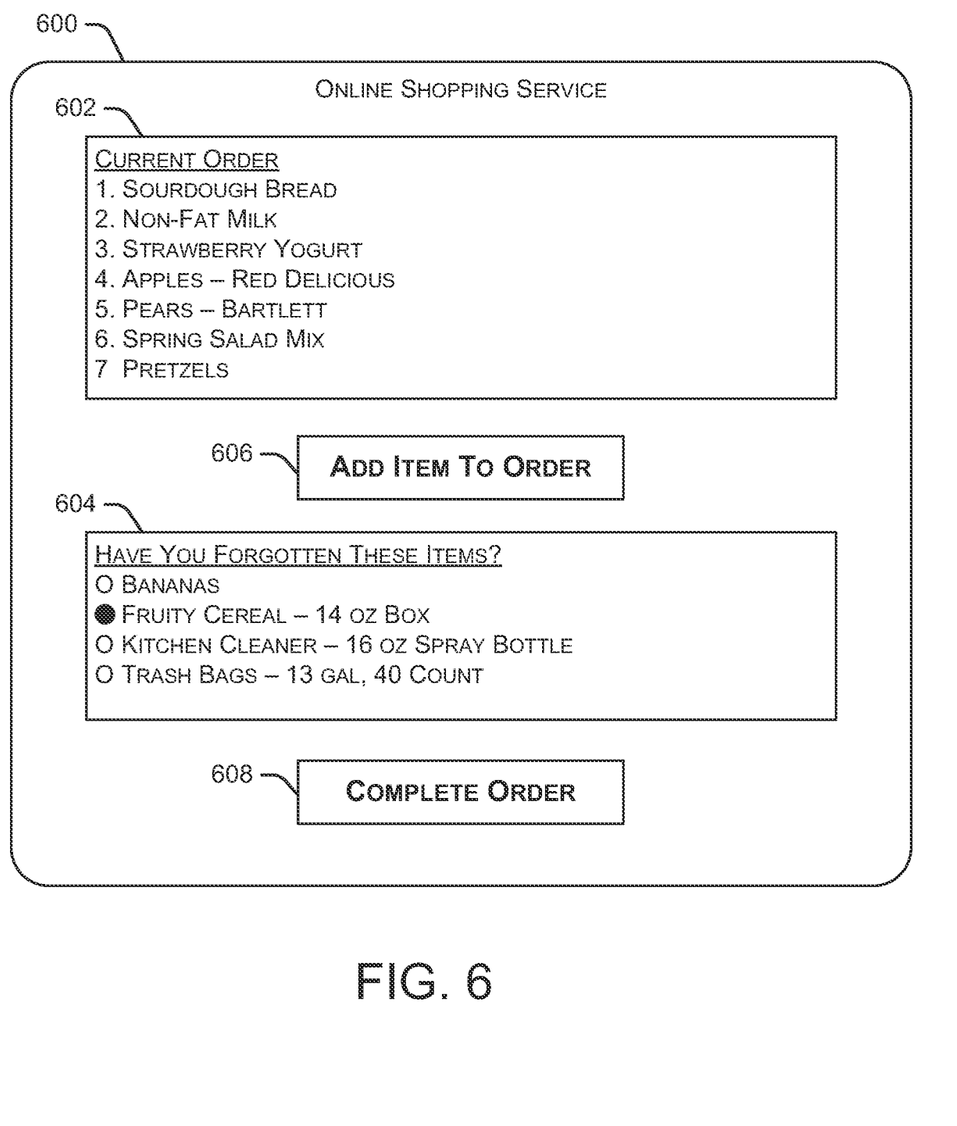
FIG. 6 is a screen diagram depicting an embodiment of a user interface for customers to create online orders.

FIG. 6 is a screen diagram depicting an embodiment of a user interface 600 for customers to create online orders. User interface 600 includes a listing of items 602 selected by the customer in the current order. As discussed herein, order management system 114 may suggest one or more items to the customer based on purchase frequency, last purchase date, and number of declined suggestions. Example suggested items are shown in a window 604 along with a notation "Have you forgotten these items?" In the example of FIG. 6, four suggested items are shown in window 604. The customer can select any number of the suggested items (e.g., Fruity Cereal is selected in window 604) and click the "Add Item To Order" button 606 to add the selected item to the current order. When the customer has completed the order (i.e., the customer does not want to add any other items to the order), a "Complete Order" button 608 is activated by the customer. The order is then finalized and processed by the merchant for delivery to the customer.

Although the present disclosure is described in terms of certain specific embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:

tracking, with an order history manager comprising one or more processors, user behavior of one or more customers that use an online marketplace, wherein the online marketplace is in data communication with a data communication network comprising multiple systems and devices, and wherein the online marketplace further is in data communication with multiple brick and mortar stores of a retailer located in different geographical locations;

receiving, with a computer system comprising one or more processors, a first request to create an order from a customer of the one or more customers from the online marketplace in data communication with a brick and mortar store of the multiple brick and mortar stores of the retailer via a graphical user interface of an electronic device of the customer;

receiving, with the computer system, a respective identification of each item in a first plurality of items in the order;

receiving, with an item suggestion system comprising one or more processors, a second request for suggestions for at least one additional item to add to the order from the customer of the one or more customers using the graphical user interface of the electronic device of the customer, wherein the at least one additional item was purchased by the customer within an elapsed period of time;

determining, with the order history manager, buying habits of the customer of the one or more customers based on at least brand preferences;

identifying, with the order history manager, a second plurality of items regularly purchased by the customer of the one or more customers based on at least the buying habits of the customer other than items in the order;

identifying, using the order history manager, a purchase frequency of the second plurality of items that are regularly purchased by the customer;

determining, with the order history manager, whether any of the second plurality of items that are regularly purchased by the customer are due for purchase by the customer based on rules governing a predetermined period of time that an item of the second plurality of items that are regularly purchased by the customer was purchased by the customer as a function of the purchase frequency and the buying habits of the customer;

filtering, with the order history manager, a list of the second plurality of items that are regularly purchased by the customer based on the rules governing the predetermined period of time, wherein the rules comprise a limit to a number of times the item of the second plurality of items is suggested, prior to transmitting a list of suggestions for the at least one additional item in response to the second request by the customer;

receiving, at the item suggestion system from the order history manager, the list of the second plurality of items that are regularly purchased;

filtering, with the item suggestion system, the list of the second plurality of items that are regularly purchased by the customer that are within the predetermined period of time based on the purchase frequency and a last purchase date for a particular item of the second plurality of items that are regularly purchased;

identifying, with the item suggestion system, a hierarchy of N highest ranked items of the second plurality of items that are regularly purchased by the customer, as filtered, to create a final list of regularly purchased items by the customer, wherein items of the second plurality of items that are in stock are ranked higher than the items of the second plurality of items that are out of stock;

sending instructions for simultaneous display of a first window and a second window on the graphical user interface of the electronic device of the customer, wherein the first window presents the first plurality of items in the order and the second window presents the final list of regularly purchased items by the customer, wherein one or more items of the final list of regularly purchased items are selectable by a customer input using the graphical user interface via the second window of the graphical user interface to add the one or more items to the first window of the graphical user interface;

receiving the customer input from the graphical user interface of the electronic device of the customer to either (a) add a selection of the one or more items from the final list of regularly purchased items by the customer presented in the second window of the graphical user interface to the order in the first window of the graphical user interface or (b) decline to add a selection of the one or more items from the final list of regularly purchased items by the customer; and finalizing, with the item suggestion system, the order of the customer presented in the first window of the graphical user interface based on the first request and the second request of the customer and the customer input.

2. The method of claim 1, further comprising:

determining whether a number of times the customer declined to add a second particular item exceeds a predetermined threshold value; and removing the second particular item from a purchase option presented to the customer of the one or more customers responsive to determining that the number of times the customer declined to add the second particular item exceeds the predetermined threshold value.

3. The method of claim 1, wherein the hierarchy of N highest ranked items of the second plurality of items that are regularly purchased by the customer is based on the purchase frequency by the customer, a last purchase date of the customer, and a number of times the customer declined to add a particular item.

4. The method of claim 3, wherein sending the instructions for the simultaneous display of the first window and the second window on the graphical user interface of the electronic device of the customer further comprises presenting top N ranked items of the second plurality of items to the customer for purchase by the customer.

5. The method of claim 1, wherein the order is an online order coupled to an order processing system to fulfill the order of the customer of the one or more customers.

6. A method comprising:

tracking, with an order history manager comprising one or more processors, user behavior of one or more customers that use an online marketplace, wherein the online marketplace is in data communication with a data communication network comprising multiple systems and devices, and wherein the online marketplace further is in data communication with multiple brick and mortar stores of a retailer located in different geographical locations;

receiving, with a computer system comprising one or more processors, a first request to create an order from a customer of the one or more customers from the online marketplace in data communication with a brick and mortar store of the multiple brick and mortar stores of the retailer via a graphical user interface of an electronic device of the customer;

receiving, with the computer system, a respective identification of each item in a first plurality of items in the order;

receiving, with an item suggestion system comprising one or more processors, a second request for suggestions for at least one additional item to add to the order from the customer of the one or more customers using the graphical user interface of the electronic device of the customer, wherein the at least one additional item was purchased by the customer within an elapsed period of time;

determining, with the order history manager, buying habits of the customer of the one or more customers based on at least brand preferences;

identifying, with the order history manager, a second plurality of items regularly purchased by the customer based on at least the buying habits of the customer other than items in the order;

identifying, with the order history manager, a purchase frequency of the second plurality of items that are regularly purchased by the customer;

determining, with the order history manager, whether any of the second plurality of items that are regularly purchased by the customer are due for purchase by the customer based on rules governing a predetermined period of time that an item of the second plurality of items that are regularly purchased by the customer was purchased by the customer as a function of the purchase frequency and the buying habits of the customer;

filtering, with the order history manager, a list of the second plurality of items that are regularly purchased by the customer based on the rules governing the predetermined period of time, wherein the rules comprise a limit to a number of times the item of the second plurality of items is suggested, prior to transmitting a list of suggestions for the at least one additional item in response to the second request by the customer;

receiving, at the item suggestion system from the order history manager, the list of the second plurality of items that are regularly purchased;

identifying, with the order history manager, a number of times the second plurality of items that are regularly purchased have been previously suggested to the customer and declined by the customer within a predetermined threshold period of time;

filtering, with the item suggestion system, for removal of each respective item of the list of the second plurality of items that are regularly purchased by the customer that exceed the number of times the each respective item was declined by the customer when previously suggested to the customer prior to transmitting a list of additional items to suggest per the second request of the customer;

filtering, with the item suggestion system, a list of the regularly purchased items, as filtered, that are within the predetermined period of time based on the purchase frequency, and a last purchase date;

identifying, with the item suggestion system, a hierarchy of N highest ranked items of the second plurality of items that are regularly purchased, as twice filtered, to create a final list of regularly purchased items by the customer, wherein items of the second plurality of items that are in stock are ranked higher than the items of the second plurality of items that are out of stock;

sending instructions for simultaneous display of a first window and a second window on the graphical user interface of the electronic device of the customer, wherein the first window presents the first plurality of items in the order and the second window presents the final list of regularly purchased items by the customer, wherein one or more items of the final list of regularly purchased items are selectable by a customer input using the graphical user interface via the second window of the graphical user interface to add the one or more items to the first window of the graphical user interface;

receiving the customer input from the graphical user interface of the electronic device of the customer to either (a) add a selection of the one or more items from the final list of regularly purchased items by the customer presented in the second window of the graphical user interface to the order in the first window of the graphical user interface or (b) decline to add a selection of the one or more items from the final list of regularly purchased items by the customer; and finalizing the order of the customer presented in the first window of the graphical user interface based on the first request and the second request of the customer and the customer input.

7. The method of claim 6, wherein the order is an online order coupled to an order processing system to fulfill a final order of the customer of the one or more customers.

8. An apparatus comprising:
a memory to store data associated with an online order; and
one or more processors coupled to the memory, the one or more processors configured to perform:
tracking, with an order history manager comprising one or more processors, user behavior of one or more customers that use an online marketplace, wherein the online marketplace is in data communication with a data communication network comprising multiple systems and devices, and wherein the online marketplace further is in data communication with multiple brick and mortar stores of a retailer located in different geographical locations;
receiving a first request to create an order from a customer of the one or more customers from the online marketplace in data communication with a brick and mortar store of the multiple brick and mortar stores of the retailer via a graphical user interface of an electronic device of the customer;
receiving a respective identification of each item in a first plurality of items in the order;
receiving a second request for suggestions for at least one additional item to add to the order from the customer of the one or more customers using the graphical user interface of the electronic device of the customer, wherein the at least one additional item was purchased by the customer within an elapsed period of time;
determining buying habits of the customer of the one or more customers based on at least brand preferences;
identifying a second plurality of items regularly purchased by the customer of the one or more customers based on at least the buying habits of the customer other than items in the order;
identify a purchase frequency of the second plurality of items that are regularly purchased by the customer;
determining whether any of the second plurality of items that are regularly purchased by the customer are due for purchase by the customer based on rules governing a predetermined period of time that an item of the second plurality of items that are regularly purchased by the customer was purchased by the customer as a function of the purchase frequency and the buying habits of the customer;
filtering a list of the second plurality of items that are regularly purchased by the customer based on the rules governing the predetermined period of time, wherein the rules comprise a limit to a number of times the item of the second plurality of items is suggested, prior to transmitting a list of suggestions for the at least one additional item in response to the second request by the customer;
receiving the list of the second plurality of items that are regularly purchased;
filtering a list of the regularly purchased items, as filtered, that are within the predetermined period of time based on the purchase frequency and a last purchase date for a particular item of the second plurality of items that are regularly purchased;
identifying identify a hierarchy of N highest ranked items of the second plurality of items that are regularly purchased by the customer, as twice filtered, to create a final list of regularly purchased items by the customer, wherein items of the second plurality of items that are in stock are ranked higher than the items of the second plurality of items that are out of stock;
sending instructions for simultaneous display of a first window and a second window on the graphical user interface of the electronic device of the customer, wherein the first window presents the first plurality of items in the order and the second window presents the final list of regularly purchased items by the customer, wherein one or more items of the final list of regularly purchased items are selectable by a customer input using the graphical user interface via the second window of the graphical user interface to add the one or more items to the first window of the graphical user interface;
receiving the customer input from the graphical user interface of the electronic device of the customer to either (a) add a selection of the one or more items from the final list of regularly purchased items by the customer presented in the second window of the graphical user interface to the order in the first window of the graphical user interface or (b) decline to add a selection of the one or more items from the final list of regularly purchased items by the customer; and
finalizing the order of the customer presented in the first window of the graphical user interface based on the first request and the second request of the customer and the customer input.

9. The apparatus of claim 8, wherein the one or more processors are further configured to perform:
determining whether a number of times the customer declined to add the suggestions for a second particular item exceeds a predetermined threshold value; and removing the second particular item from a purchase option presented to the customer of the one or more customers responsive to determining that the number of times the customer declined to add the suggestions for the second particular item exceeds the predetermined threshold value.

10. The method of claim 1, wherein receiving the customer input from the graphical user interface of the electronic device of the customer further comprises:
receiving an indication that the customer of the one or more customers no longer purchases a second particular item; and
the method further comprises:
removing the second particular item from a purchase option presented to the customer of the one or more customers.

11. The method of claim 6, wherein receiving the customer input from the graphical user interface of the electronic device of the customer of the one or more customers further comprises:
receiving an indication that the customer of the one or more customers no longer purchases a second particular item; and
the method further comprises:
removing the second particular item from a purchase option presented to the customer of the one or more customers.

12. The apparatus of claim 9, wherein:
receiving the customer input from the graphical user interface of the electronic device of the customer of the one or more customers further comprises:
receive an indication that the customer of the one or more customers no longer purchases the second particular item; and
the one or more processors are configured to further perform:
remove the second particular item from a purchase option presented to the customer of the one or more customers.

13. The method of claim 1, wherein the online market place is associated with the retailer located in other geographic locations.

14. The method of claim 6, wherein the online market place is associated with the retailer located in other geographic locations.

15. The apparatus of claim 8, wherein the-online market place is associated with the retailer located in other geographic locations.

16. The method of claim 1, further comprising:
creating, using an order management system with one or more processors, the order requested by the customer of the one or more customers to facilitate an order checkout process and delivery options.

17. The method of claim 6, further comprising:
creating, using an order management system with one or more processors, the order requested by the customer of the one or more customers to facilitate an order checkout process and delivery options.

18. The apparatus of claim 8, wherein the one or more processors are further configured to perform:
creating the order requested by the customer of the one or more customers to facilitate an order checkout process and delivery options.

19. The method of claim 1, further comprising:
presenting to the graphical user interface a reminder for a particular item at predetermined intervals.

20. The method of claim 6, further comprising:
presenting to the graphical user interface a reminder for a particular item at predetermined intervals.

\* \* \* \* \*